United States Patent
Lee et al.

(10) Patent No.: US 9,001,929 B2
(45) Date of Patent: Apr. 7, 2015

(54) METHOD AND APPARATUS FOR TRANSMITTING SYMBOL REPEATEDLY IN WIRELESS COMMUNICATION SYSTEM

(75) Inventors: Il Gu Lee, Seoul (KR); Heejung Yu, Daejeon-si (KR); Hun Sik Kang, Daejeon-si (KR); Sok Kyu Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 476 days.

(21) Appl. No.: 13/347,143

(22) Filed: Jan. 10, 2012

(65) Prior Publication Data

US 2012/0177144 A1    Jul. 12, 2012

(30) Foreign Application Priority Data

Jan. 10, 2011  (KR) .................. 10-2011-0002418
Jan. 10, 2012  (KR) .................. 10-2012-0003159

(51) Int. Cl.
*H04L 27/20*    (2006.01)
*H04L 27/26*    (2006.01)
*H04L 1/00*     (2006.01)
*H04L 1/08*     (2006.01)

(52) U.S. Cl.
CPC .......... *H04L 27/2602* (2013.01); *H04L 1/0072* (2013.01); *H04L 1/0079* (2013.01); *H04L 1/08* (2013.01)

(58) Field of Classification Search
CPC .................................................. H04L 27/2692
USPC ........................................................... 375/308
See application file for complete search history.

(56) References Cited

U.S. PATENT DOCUMENTS

| | | | |
|---|---|---|---|
| 6,243,413 B1 * | 6/2001 | Beukema | 375/222 |
| 7,711,061 B2 | 5/2010 | Trachewsky | |
| 8,494,087 B2 * | 7/2013 | Seyedi-Esfahani | 375/298 |
| 2007/0280173 A1 | 12/2007 | Jo et al. | |
| 2010/0260159 A1 * | 10/2010 | Zhang et al. | 370/338 |
| 2010/0322179 A1 * | 12/2010 | Yu et al. | 370/329 |

FOREIGN PATENT DOCUMENTS

KR    1020070061131 A    6/2007

\* cited by examiner

*Primary Examiner* — Lihong Yu (57) ABSTRACT

A method and an apparatus for a transmitter to transmit data in a wireless communication system are provided. This method includes: generating a first signal field including at least one symbol; generating a second signal field configured by repeating at least one symbol of the first signal field; and transmitting a frame including the first signal field, the second signal field, and a data field and a first symbol of the second signal field is modulated through binary phase shift keying (BPSK) and symbols from a second symbol of the second signal field are modulated through Q-BPSK. According to the present invention, a service filed can be extended while maintaining compatibility with a wireless communication system in the related art by transmitting a frame using symbol repetition.

20 Claims, 12 Drawing Sheets

(a) | Preamble | L-SIG | N-SIG | N-SIG' | N-Preamble | N-DATA |

(b) | Preamble | L-SIG | N-SIG'' | N-Preamble | N-DATA |

(c) | L-STF | L-LTF | N-SIG | HT-N-SIG | HT-N-LTF | N-DATA |

METHOD AND APPARATUS FOR TRANSMITTING SYMBOL REPEATEDLY IN WIRELESS COMMUNICATION SYSTEM

CROSS-REFERENCE TO RELATED APPLICATIONS

This application claims the benefit of priority of Korean Patent Application No. 10-2011-0002418 filed on Jan. 10, 2011 and Korean Patent Application No. 10-2012-0003159 filed on Jan. 10, 2012, all of which is incorporated by reference in its entirety herein.

BACKGROUND OF THE INVENTION

1. Field of the Invention

The present invention relates to a wireless communication system, and more particularly, to a method and an apparatus for transmitting a symbol repeatedly.

2. Related Art

In a wireless communication system, a research for providing services of various qualities of service (QoS) having a high transmission rate to users is in active progress. In a wireless local area network (WLAN) system as one example of the communication system, a research into methods for transmitting a large amount of data at high speed and in a stable through a limited resource. In particular, in the wireless communication system, a research into transmission of data through a wireless channel is in progress. In recent years, methods for the WLAN system to, normally transmitting and receiving a large amount of data by effectively using a limited wireless channel have been proposed.

Further, the wireless communication system uses a high-order modulation method and more carriers in a limited frequency band in order to improve a data transmission rate and a throughput and uses a method for reducing the length of the symbol. A service area can be extended by acquiring a diversity effect through repeating the symbol and a signal reaching distance increases as the number of symbol repetition times, while the data transmission rate decreases. That is; the signal reaching distance and the data transmission rate has a trade-off relationship.

Meanwhile, the large amount of data, for example, a data packet transmitted and received through the wireless channel in the communication system includes a data field including the data transmitted and received through the wireless channel and a signal field including information on the data field. In the communication system, it is checked whether the signal field is normally checked and thereafter, data included in the data field is normally transmitted and received according to whether the signal field is normal.

However, since transmitted power of the wireless communication system is limited due to frequency limitation, the system design conditions improve the data transmission rate, while the signal reaching distance is limited, and as a result, improvement of the limit of the signal reaching distance is required.

SUMMARY OF THE INVENTION

The present invention provides extension of a service area while maintaining compatibility with a wireless transmitting apparatus in the related art.

The present invention also provides transmission of the number of symbol repetition times while repeatedly transmitting the symbol.

The present invention also provides improvement of a signal reaching distance with a diversity gain.

In an aspect, there is provided a method for a transmitter to transmit data in a wireless communication system, including: generating a first signal field including at least one symbol; generating a second signal field configured by repeating at least one symbol of the first signal field; and transmitting a frame including the first signal field, the second signal field, and a data field.

A first symbol of the second signal field may be modulated through binary phase shift keying (BPSK) and symbols from a second symbol of the second signal field may be modulated through Q-BPSK.

The first symbol of the second signal field may be modulated through the BPSK and the symbols from the second symbol of the second signal field may be modulated through the Q-BPSK or S-QPSK (Spread-QPSK).

At least initial three symbols of the second signal field may be BPSK-modulated.

The second signal field may be constituted by one BPSK-modulated symbol.

The second signal field may be modulated to at least one S-QPSK-modulated symbol.

The method may further include generating a third signal field configured by repeating the symbol of the first signal field, wherein the frame further includes the third signal field.

The frame may further include a preamble, and the preamble may include one of a short preamble or a long preamble or both the short preamble and the long preamble.

The frame may be a 802.11a/g standard legacy frame.

The frame may be a 802.11n standard high throughput (HT) frame.

The frame may be a 802.11ac standard very high throughput (VHT) frame.

Rate information of the second signal field may include a transmission rate of the data field.

The number of symbol repetition times of the second signal field may be determined as a modular 3 calculation result of frame length information of the first signal field.

The number of symbol repetition times may be the number of time field repetition times or the number of frequency field repetition times.

A bandwidth mode of the second signal field may be determined as the modular 3 calculation result of the frame length information of the first signal field.

A modulation method of a symbol of the data field may be determined as the modular 3 calculation result of the frame length information of the first signal field.

A CCA busy time when a receiver of the frame recognizes that a channel is not idle may be determined according to length information of the first signal field.

In repetition of the symbol of the first signal field, a time field repetition method in which the same information is transmitted after one symbol, but a symbol rearranged in a predetermined pattern is repeatedly transmitted may be used.

In the repetition of the symbol of the first signal field, a frequency field repetition method in which a signal transmitted in one bandwidth is rearranged in a predetermined pattern by using the other adjacent bandwidth or the same signal is repeatedly transmitted may be used.

In another aspect, there is provided an apparatus for transmitting data in a wireless communication system, including a processor generating a first signal field, generating a second signal field configured by repeating a symbol of the first signal field, and transmitting a frame including the first signal field, the second signal field, and a data field.

DESCRIPTION OF EXEMPLARY EMBODIMENTS

In association with a wireless LAN standard, after 802.11a/g having transmission rate of 54 Mbps is used, the 802.11n standard having the available maximum transmission rate of 600 Mbps is established and thereafter, the 802.11ac is established in order to support a higher throughput.

A frame of a data packet includes a data field DATA for transmitting data and a signal field SIG for transmitting information on the data field. The frame of the data packet includes the data field and the signal field and a training field for transmitting a preamble for the frame. By transmitting and receiving a frame of a generated data packet, a large amount of data may be transmitted and received through a limited resource.

Figure 1:
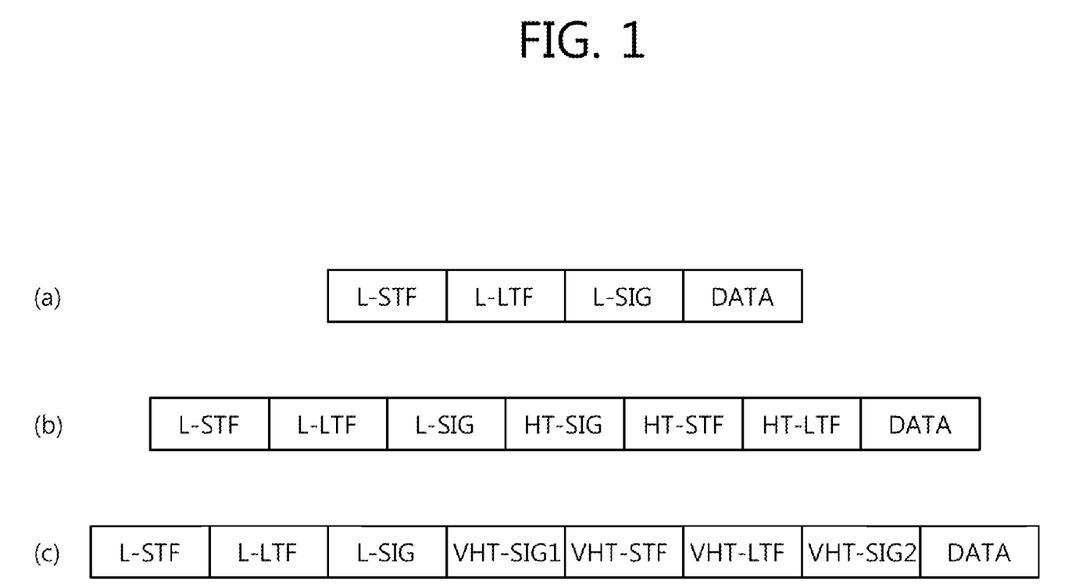
FIG. 1 is a diagram showing frame formats according to the present invention.

FIG. 1 is a diagram showing frame formats according to the present invention.

Referring to FIG. 1, FIG. 1A is used in the 802.11a/g standard as a legacy frame (alternatively, legacy mode frame). FIG. 1B is used in the 802.11n standard as a high throughput (HT) frame (alternatively, HT mode frame). FIB. IC is used in the 802.11ac standard as a very high throughput (VHT) frame (alternatively, VHT mode frame).

The legacy frame includes legacy preambles (a short preamble L-STF and a long preamble L-LTF, a legacy signal field L-SIG, and the data field DATA.

In order to maintain compatibility with the 802.11a/g in the case of the 802.11n standard, the HT frame includes the legacy preambles (the short preamble L-STF and the long preamble L-LTF), the legacy signal field, and the data field as they are. Further, when legacy terminals receive the HT frame, a rate is set to 6 Mbps in order to prevent channel accessing and the HT frame and a period when the HT frame occupies a channel is contained in packet length information to be transmitted. Simultaneously, for the HT terminals to distinguish the legacy frame and the HT frame, an HT signal field HT-SIG modulated through Q-binary phase shift keying (Q-BPSK) is included in the HT frame and HT preambles HT-STF and HT-LTF are further included.

In the case of the VHT frame of the 802.11ac standard, a first symbol of VHT-SIG1 is maintained through BPSK and a second symbol is modulated through the Q-BPSK to be transmitted to discriminate the legacy frame, the HT frame, and the VHT frame. The VHT frame includes a VHT-SIG1 and a VHT-SIG2 which are signal field separated unlike the HT frame.

Figure 2:
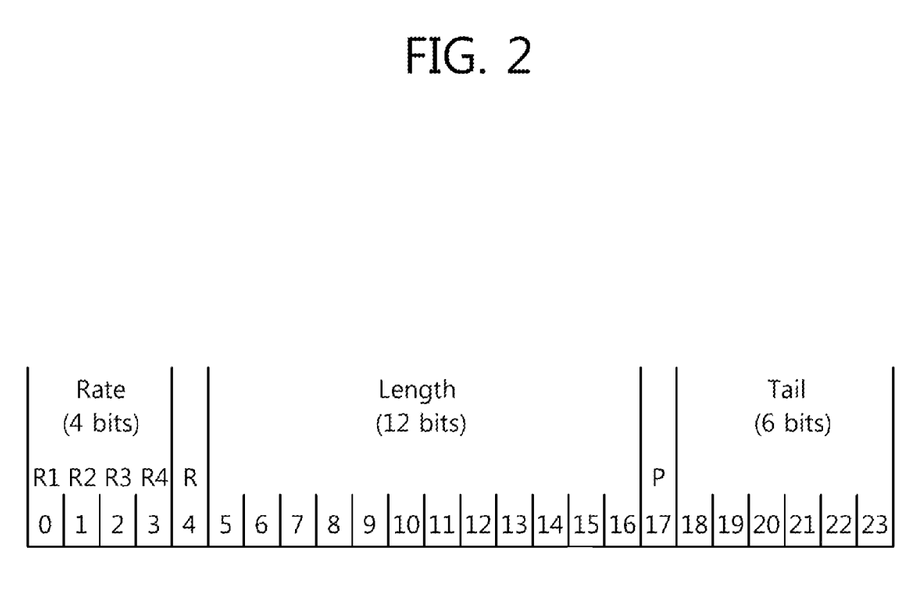
FIG. 2 shows a signal field format of a legacy frame according to the present invention.

FIG. 2 shows a signal field format of a legacy frame according to the present invention.

Referring to FIG. 2, the signal field may be constituted by transmission rate bits (for example, 4 bits) of the data field and packet length bits (for example, 10 bits). Further, the signal field further includes reserve (R) bits of 1 bit, and parity check (P) and tale bits (for example, 6 bits) of 1 bit.

Figure 3:
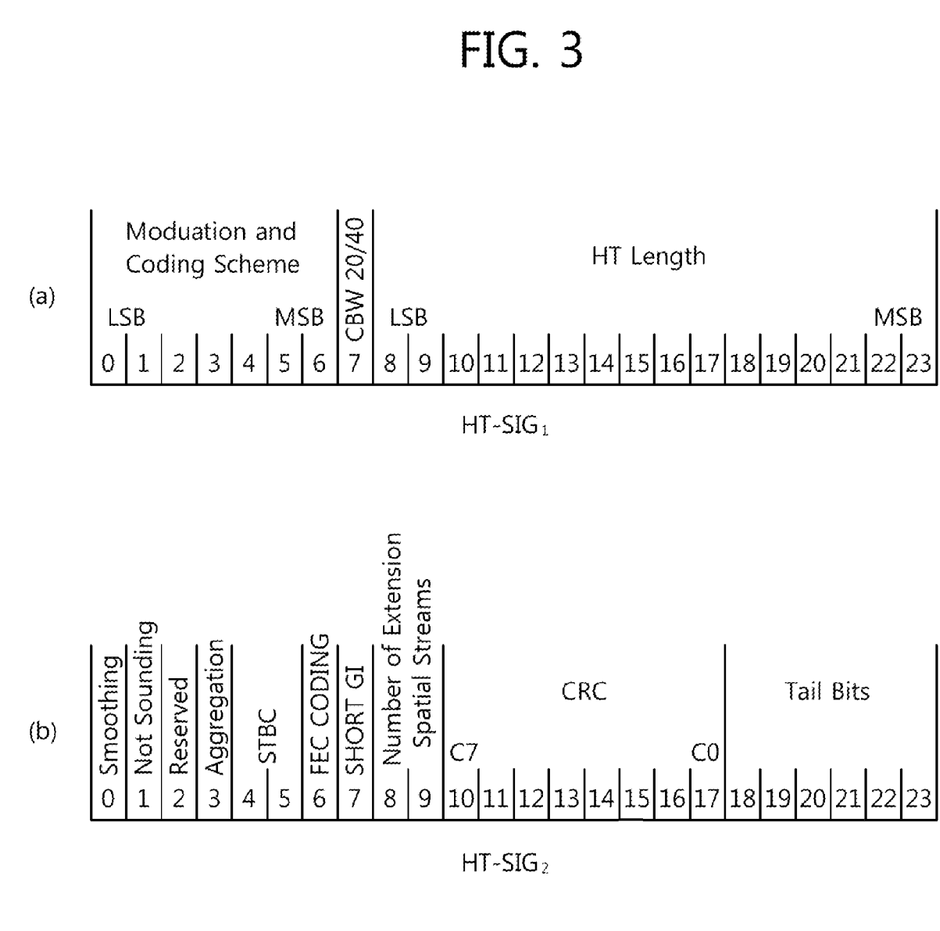
FIG. 3 shows a signal field format of an HT frame.

FIG. 3 shows a signal field format of an HT frame. FIG. 3A is the HT-SIG1 field and FIG. 3B is the HT-SIG2 field.

Referring to FIG. 3, the HT-SIG1 field includes a modulation and coding scheme (MCS), a CBW 20/40 bit, and an HT frame length bit. The HT-SIG2 field includes smoothing, not sounding, a reserved bit, a space time block coding bit (STBC) of 2 bits, a forward error correcting coding (FEC) bit, SHORT GI, number of extension spatial streams, a cyclic redundancy check (CRC) code, and a tail bit.

Hereinafter, a frame transmitting method according to the present invention will be described.

A frame format according to the present invention further includes a signal field N-SIG newly defined as well as a signal field L-SIG used in wireless terminals. Both a short preamble L-STF and a long preamble L-LTF may be included in a preamble included in a frame.

Figure 4:
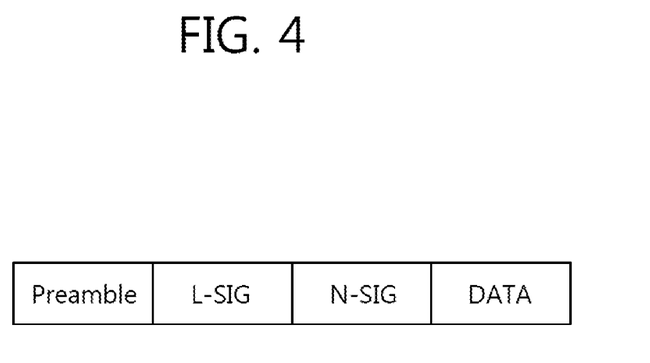
FIG. 4 shows one example of a wireless transmission legacy frame configured by using a symbol repetition technique according to the present invention.

FIG. 4 shows one example of a wireless transmission legacy frame configured by using a symbol repetition technique according to the present invention.

Referring to FIG. 4 (mode 1), the wireless transmission legacy frame includes a legacy preamble and a signal field L-SIG field in order to maintain compatibility with another wireless transmission method. Further, the wireless transmission legacy frame further includes an N-SIG field at a position next to the L-SIG field.

The N-SIG field is configured to be modulated through a BPSK modulation method or a spread quadrature phase shift keying (S-QPSK) modulation method. According to the present invention, exemplary embodiments constituting the N-SIG field will be described below.

As one example (first exemplary embodiment), the N-SIG field is configured by repeatedly using a symbol of the L-SIG field, however, a first symbol of the N-SIG field is modulated through the BPSK and symbols after a second symbol of the N-SIG field are configured to be modulated through the Q-BPSK. The Q-BPSK is a modulation method acquired by phase-shifting the BPSK by 90 degrees. When a frame including the N-SIG field is transmitted to a receiver, the receiver may judge whether the symbol of the L-SIG field is repeated in the frame by considering whether there is the symbol modulated through the BPSK. Further, the receiver may judge the number of symbol repetition times through the number of symbols modulated through the Q-BPSK before the first symbol of the N-SIG field. IN addition, the N-SIG field may include information on a rate and a length of a repeated symbol transmission frame and bandwidth mode information may be transmitted by a "modular 3" calculation result of the frame length information included in the N-SIG field. Herein, since a Euclidean distance is longest in the BPSK and the Q-BPSK, a comparison detection method of the BPSK and the Q-BPSK are used, but even a comparison of other modulation methods may be used. For example, comparison detection of the BPSK and S-QPSK may also be adopted.

As another example (second exemplary embodiment), the N-SIG field is configured by repeatedly using the symbol of the L-SIG field, however, the first symbol of the N-SIG field is modulated through the BPSK and symbols from a second symbol of the N-SIG field are configured to be modulated through the Q-BPSK or S-QPSK. In this case, the frame including the N-SIG field may be distinguished from other terminals (802.11a/g, 802.11n, and 802.11 ac) initially consecutive three BPSK-modulated symbols of the N-SIG field and may be judged as a new frame by considering that a fourth symbol of the N-SIG field is not the BPSK-modulated symbol. Further, a first symbol of the L-SIG field is repeated in the N-SIG field to enable a terminal supporting repeated symbol transmission to execute spoofing for extending a service area and the frame including the N-SIG field may be distinguished from the 802.11n HT frame. Further, the frame including the N-SIG field may be distinguished from the 802.11 ac VHT frame in that the first symbol of the N-SIG field is the BPSK modulated symbol. The frame including the N-SIG field may be distinguished from an existing frame in that a second symbol of the N-SIG field is the Q-BPSK or S-QPSK modulated symbol. In this case, since the terminal supporting the repeated symbol transmission knows modulation patterns of the first symbol and the second symbol of the N-SIG field in advance, a diversity gain may be acquired by using both symbols.

As yet another example (third exemplary embodiment), the N-SIG field may be configured to further repeat a plurality of BPSK modulated symbols. That is, the N-SIG field is configured so that at least three initial symbols of the N-SIG field are all BPSK-modulated. Therefore, even though other terminals (802.11a/g, 802.11n, and 802.11 ac) receive the frame including the N-SIG field, other terminals (802.11a/g, 802.11n, and 802.11ac) judge the corresponding frame as the legacy frame, and as a result, the frame may be spoofed to rate information and frame length information of the first L-SIG field. Meanwhile, terminals that can extend the service area by repeating the symbol judges the received frame as the frame including the N-SIG field when the rate information of the L-SIG field is set as 9 Mbps or a modular 3 calculation result of the frame length information is not 0 (when the modular 3 calculation result is 1 or 2).

As yet another example (fourth exemplary embodiment), the N-SIG field may be configured by one BPSK modulated symbol. In this case, the 802.11n terminal judges the received frame as the legacy mode frame through consecutive BPSK symbols, and as a result, it is not problematic, but the 802.11ac terminal may not be the BPSK modulation method after the N-SIG field, it may be problematic. Therefore, other terminals recognizes the frame as the legacy frame by setting the rate information of the L-SIG field as 9 Mbps and the rate information of the N-SIG field may be configured to include the transmission rate of the data field.

As yet another example (fifth exemplary embodiment), the N-SIG field may be configured to further repeat at least one symbol which is S-QPSK-modulated other than the BPSK modulated symbol. In this case, for the terminal (802.11a/g terminal, 802.11n terminal, or 802.11 ac terminal) to recognize the frame including the N-SIG field as the legacy frame, the rate information of the L-SIG field may be set as 9 Mbps and the rate information of the N-SIG field may be configured to include the transmission rate of the data field. That is, the rate information of the first symbol of the N-SIG field is set as 9 Mbps and BPSK-modulated and a transmission time is set in the length information and the symbols from the second symbol of the N-SIG field include the rate information used to modulate the data field, but S-QPSK-modulated to be repeatedly transmitted at the predetermined of times.

In the case of a wireless LAN device receiving the frame, the frame is received by the 802.11a/g receiver at 9 Mbps and the L-SIG field may be spoofed by the length information and since the 802.11n receiver or 802.11ac receiver is not a 6 Mbps mode packet, the 802.11n receiver or 802.11 ac receiver judges the received frame as the legacy frame to spoof the L-SIG field.

Further, since a frequency diversity effect can be acquired through the S-QPSK-modulated symbols, a signal reaching distance can be extended and it can be known that the frame is a frame to which a symbol repetition technology is applied according to the present invention through detection of the S-QPSK modulation at the receiver.

Figure 5:
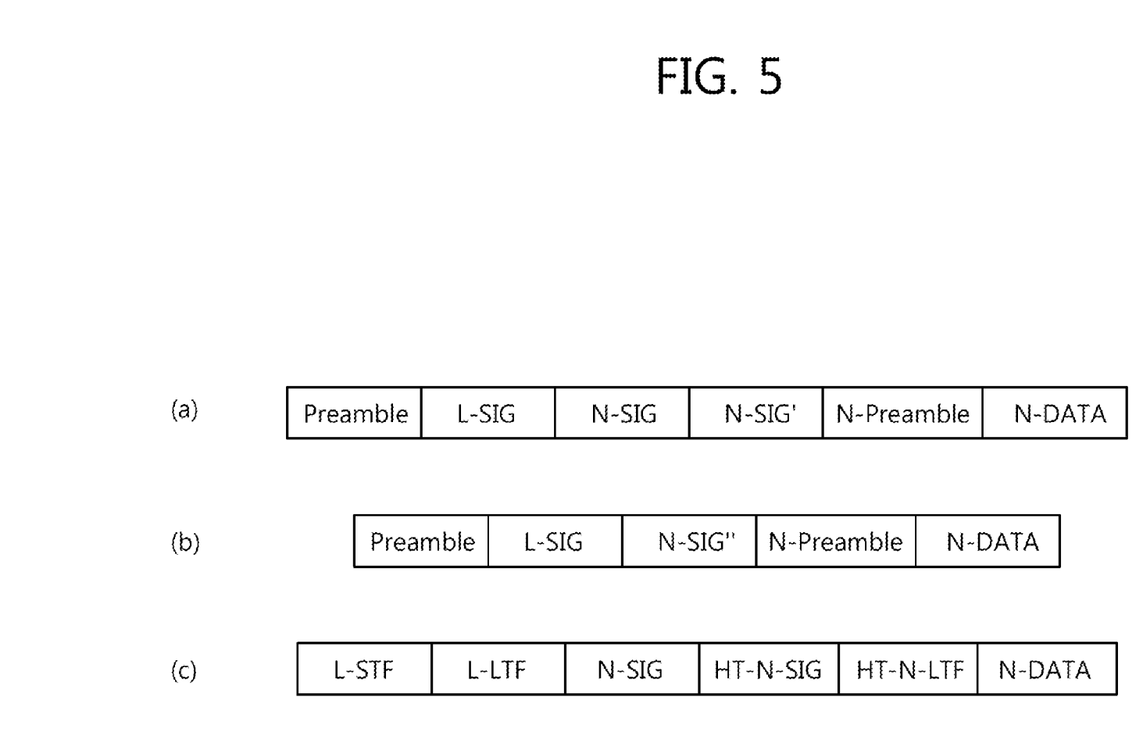
FIG. 5 shows one example of a wireless transmission HT frame (alternatively, VHT frame) configured by using the symbol repetition technique according to the present invention.

FIG. 5 shows one example of a wireless transmission HT frame (alternatively, VHT frame) configured by using the symbol repetition technique according to the present invention.

Referring to FIG. 5 (mode 2), FIG. 5A includes the legacy preamble and the L-SIG field in order to maintain compatibility with the terminal in the related art and, includes the N-SIG field according to the present invention, and further includes an N-SIG' field which is another N-SIG field. Further, FIG. 5A may include an N-preamble field and an N-data field.

The N-SIG field may be configured through first to fifth exemplary embodiments of FIG. 4 described above. The N-SIG' field is configured to repeatedly transmit the symbol of the L-SIG field through the Q-BPSK or S-QPSK modulation.

In this case, the receiver a start of the N-SIG' field may be detected through a transmission point of the Q-BPSK or S-QPSK modulated symbol. The exemplary embodiment of FIG. 4 and the exemplary embodiment of FIG. 5 may be distinguished from each other according to whether or not the N-SIG' field exists. Therefore, the number of symbol repetition times may be distinguished through whether or not the N-SIG' field exists. That is, the number of symbol repetition times may be known through the number of symbols in the N-SIG field before the N-SIG' field starts.

FIG. 5B includes the legacy preamble and the L-SIG field in order to maintain the compatibility with the terminal in the related art, but may further include 802.11a/g, 802.11n, and 802.11ac and a new signal field N-SIG" which may be distinguished from the frame of FIG. 5A.

As another example, the N-SIG" field may configured by adding up the N-SIG field and the N-SIG field'.

When the N-SIG field or the N-SIG' field (alternatively, N-SIG" field) including information associated with the number of time field repetition times or the number of frequency field repetition times is transmitted, the receiver may perform decoding by using the information.

FIG. 5C shows another example of the frame according to the present invention in the wireless LAN standard. The frame may be the HT frame and may further include an HT-N-SIG field which is a new signal field and an HT-N-LTF field which is a new preamble field.

Meanwhile, a method of notifying a modulation method of a data symbol by using rate information L-RATE for maintaining the compatibility and extending the reaching distance of the frame to which the symbol repetition technology in the frame transmitting method will be described.

As one example, when the rate information is 9 Mbps, the data symbol is S-QPSK-modulated to be transmitted by using the symbol repetition technology.

As shown in Equation 1 below, a packet length value of the L-SIG field may be provided to be set (see Paragraph 9.13.4 of the IEEE 802.11n wireless LAN standard).

$$L\_LENGTH = \left\lceil \frac{(TXTIME - \text{Signal Extension}) - (aPreambleLength + aPLCPHeaderLength)}{aSymbolLength} \right\rceil \times N_{OPS} - \left\lceil \frac{aPLCPServiceLength + aPLCPConvolutionalTailLength}{8} \right\rceil \quad [\text{Equation 1}]$$

When a parameter value provided in the IEEE 802.11n wireless LAN standard is substituted, the packet length value of the L-SIG field may be simplified as shown in Equation 2 below.

$$L\_LENGTH = \left\lceil \frac{((TXTIME - \text{Signal Extension}) - 20))}{4} \right\rceil \times 3 - 3 \quad [\text{Equation 2}]$$

Equation 2 above may be modified into Equation 3 below in order to determine the number of time field repetition times or the number of frequency field repetition times.

$$L\_LENGTH = \left\lceil \frac{((TXTIME - \text{Signal Extension}) - 20))}{4} \right\rceil \times 3 - 3 - n \quad [\text{Equation 3}]$$

Herein, n as one value of 0, 1, and 2 indicates the number of time field repetition times or the number of frequency field repetition times. As one example, when n is 0, the number of time or frequency field repetition times may be set to 1, when n is 1, the number of time or frequency field repetition times may be set to 2, and when n is 2, the number of time or frequency field repetition times may be set to 4. Further, when the time field repetition technology is used, the same symbol may be transmitted repeatedly at 2n−1 times and similarly, when the frequency field repetition technology is used, the same band may be duplicated and transmitted at 2n−1 times.

As one example, in Equation 3, since n is subtracted from a multiple of 3, the number of symbol repetition times (the number of time field repetition times or the number of frequency field repetition times) may be determined and transmitted according to a modular 3 calculation result of the frame length information of the signal field. For example, when the modular 3 calculation result of the frame length information of the signal field is 0, the symbol is repeated once, when the modular 3 calculation result of the frame length information of the signal field is 1, the symbol is repeated twice, and when the modular 3 calculation result of the frame length information of the signal field is 2, the symbol is repeated at three times. In this case, when the modular 3 calculation result of the frame length information of the signal field is 2, the data symbol is repeated at more three times, and as a result, the signal reaching distance increases, while the transmission rate decreases by ¼ times. Further, the signal field may be the L-SIG field or the N-SIG field.

As another example, a bandwidth mode may be determined and transmitted according to the modular 3 calculation result of the frame length information of the signal field. For example, when the modular 3 calculation result of the frame length information of the signal field is 0, the bandwidth mode is set to a 5 MHz bandwidth repetition mode (bandwidth mode 1), when the modular 3 calculation result of the frame length information of the signal field is 1, the bandwidth mode is set to a 10 MHz bandwidth repetition mode (bandwidth mode 2), and when the modular 3 calculation result of the frame length information of the signal field is 2, the bandwidth mode is set to a 20 MHz bandwidth repetition mode (bandwidth mode 3). That is, on the assumption that the wireless transmission system is in the 20 MHz MODE, when the modular 3 calculation result of the frame length information of the signal field is 1, a 10 MHz bandwidth signal is duplicated twice in the frequency field to be transmitted in a bandwidth of 20 MHz from the data field symbol. In this case, the signal field may be the L-SIG field or the N-SIG field.

As yet another example, the modulation method of the data symbol may be determined and transmitted according to the modular 3 calculation result of the frame length information of the signal field. For example, when the modular 3 calculation result of the frame length information of two signal symbols is not 0 (when the modular 3 calculation result is 1 or 2), the data symbol is S-QPSK-modulated to be repeatedly transmitted.

Meanwhile, a clear channel assessment (CCA) busy time may be acquired by using the length information of Equation 2. Herein, the CCA busy time represents a time when the receiver recognizes that the channel is not idle.

$$CCAbusytime = 20us + 4us \times \left\lceil \frac{L\_LENGTH + 3}{3} \right\rceil \times SignalExtension \quad [\text{Equation 4}]$$

For example, in a wireless transmission method in which one symbol duration is (4*N) us longer than 4 us (however, n is an integer), Equation 4 above may be modified into Equation 5 below.

$$CCAbusytime = 20 \times Nus + 4 \times Nus \times \left\lceil \frac{L\_LENGTH + 3}{3} \right\rceil \times SignalExtension \quad [\text{Equation 5}]$$

In this case, since an interframe space (IFS) also increases by N times, it is difficult to acquire a channel possessing right in a competition based protocol such as CSMA/CA. Therefore, in the case of a terminal in which the symbol duration increases by N times in a modified type shown in Equation 6 below, the CCA busy time may be calculated.

$$CCAbusytime = 20 \times Nus + 4 \times Nus \times \left\lceil \frac{L\_LENGTH + 3}{3} \right\rceil \times SignalExtension - 4 \times (N - 1)us \quad [\text{Equation 6}]$$

In this case, the CCA busy time of the data packet transmitted by Equation 3 above is shown in Equation 7 below.

$$CCAbusytime = \\ 20 \times Nus + 4 \times Nus \times \left\lceil \frac{L\_LENGTH + 3 + n}{3} \right\rceil \times \\ SignalExtension - 4 \times (N - 1) us \quad [\text{Equation 7}]$$

Figure 6:
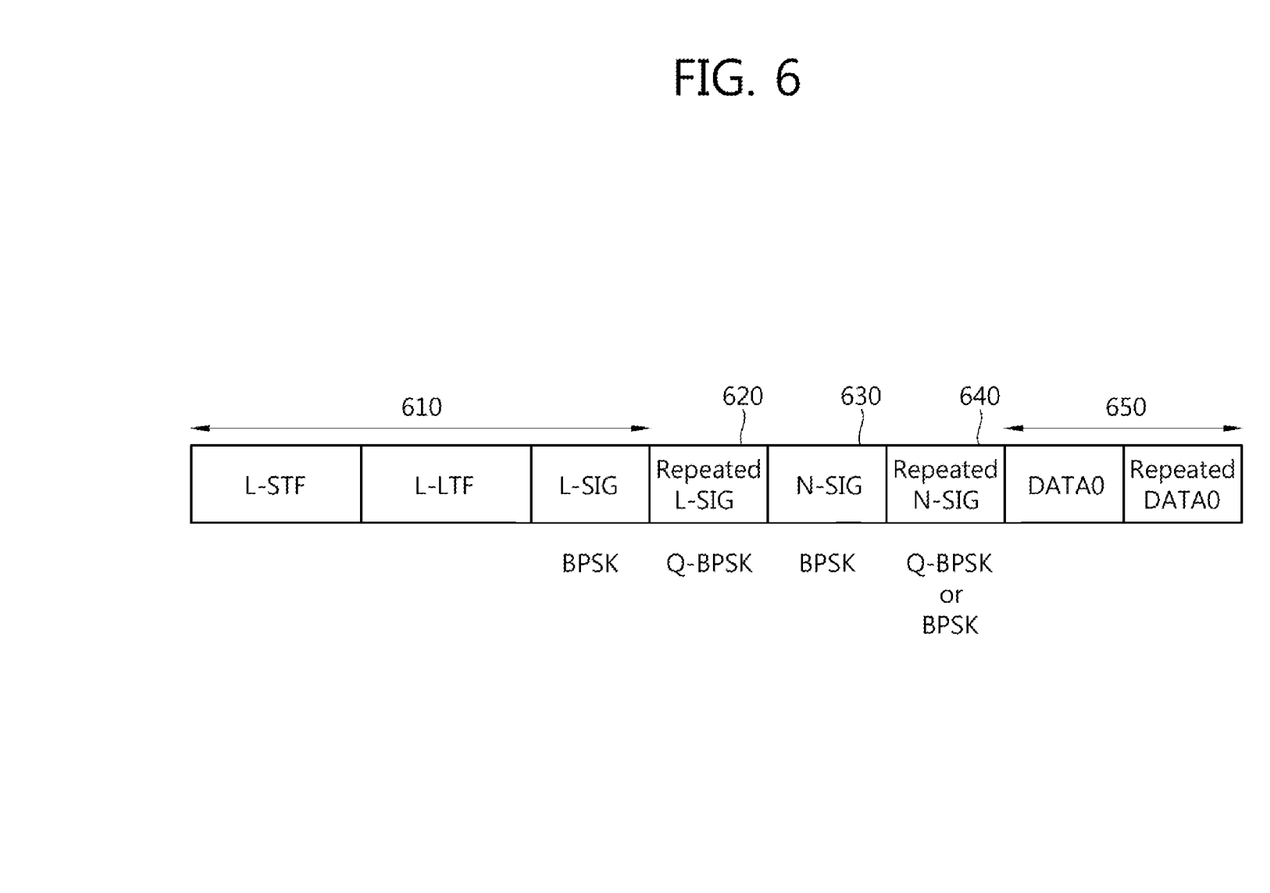
FIGS. 6 and 7 are another example showing the frame according to the present invention.
Figure 7:
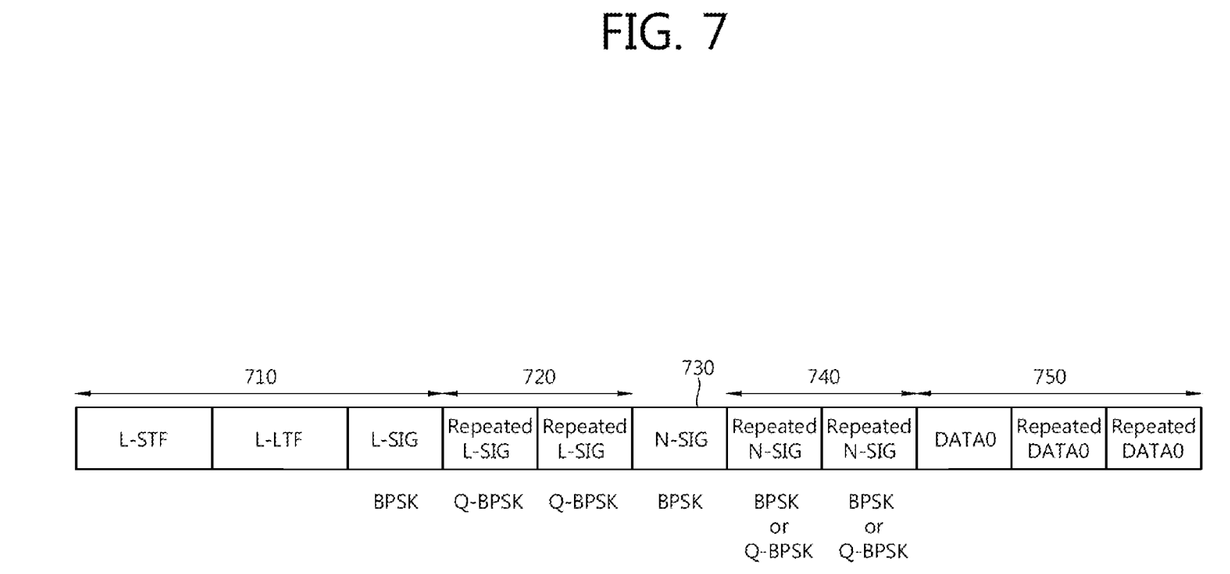

Meanwhile, FIGS. 6 and 7 are another example showing the frame according to the present invention.

Referring to FIG. 6, the frame represents a 1 symbol repetition frame of the legacy frame. Reference numeral '610' of FIG. 6 includes a short preamble L-STF and a long preamble L-LTF which are preambles for legacy compatibility and includes a legacy signal field L-SIG. As one example, the symbols of the L-SIG field are modulated through the BPSK.

In the L-STF, carrier sensing and automatic gain control are performed and a carrier frequency error may be estimated. In the L-LTF, a minute carrier frequency error may be estimated, the symbol may be synchronized, and the channel may be estimated. The L-SIG field includes the frame information such as the rate or the frame length. A terminal which does not use the symbol repetition technology may spoof the frame by setting a network allocation vector (NAV) based on the frame information. Further, the L-SIG field may include information indicating the number of frequency field repetition times or the number of time field symbol repetition times.

Reference numeral '620' of FIG. 6 is acquired by repeating the symbols of the L-SIG field of '610', but the Q-BPSK-modulated symbols. Therefore, in the case of a terminal that supports the symbol repetition technology, whether or not the received frame is in the symbol repetition mode may be known based on whether or not the received frame is Q-BPSK-modulated. Since the diversity gain may be acquired through repetition of the symbol, reception performance of the terminal is improved.

Reference numeral '630' of FIG. 6 as a new field N-SIG for repeatedly transmitting the symbol includes information regarding a frame rate and the length of a symbol repetition transmission frame. As one example, reference numeral '630' is BPSK-modulated and the receiver counts the number of previously repeated Q-BPSK symbols to know the number of symbol repetition times.

Reference numeral '640' of FIG. 6 is a field in which the symbols of the N-SIG field are repeated and the symbols are Q-BPSK-modulated or BPSK-modulated to be transmitted. Additional information such as whether or not the frequency is duplicated may be known according to the symbols of reference numeral '640' are Q-BPSK-modulated or BPSK-modulated.

Reference numeral '650' of FIG. 6 is the data field and the OFDM symbol is repeatedly transmitted. The terminal that supports the symbol repetition technology may restore the data symbol according to the number of symbol repetition times found in the signal field and a mode thereof.

Referring to FIG. 7, the frame represents a 2 symbol repetition frame of the legacy frame.

Referring to FIG. 7, symbols of the L-SIG field in '710' are Q-BPSK-modulated in '720' to be repeated twice and symbols of the N-SIG field in '730' is BPSK or Q-BPSK-modulated in '740' to be repeated twice.

The receiver detects the Q-BPSK modulated symbol repeated before the N-SIG field to recognize that the number of repetition times is 2.

Meanwhile, in the present invention, comparison detection of the BPSK and the Q-BPSK is one example using a point that the Euclidian the BPSK and the Q-BPSK is longest and an exemplary embodiment using another modulation method (for example, S-QPSK) may be implemented.

Figure 8:
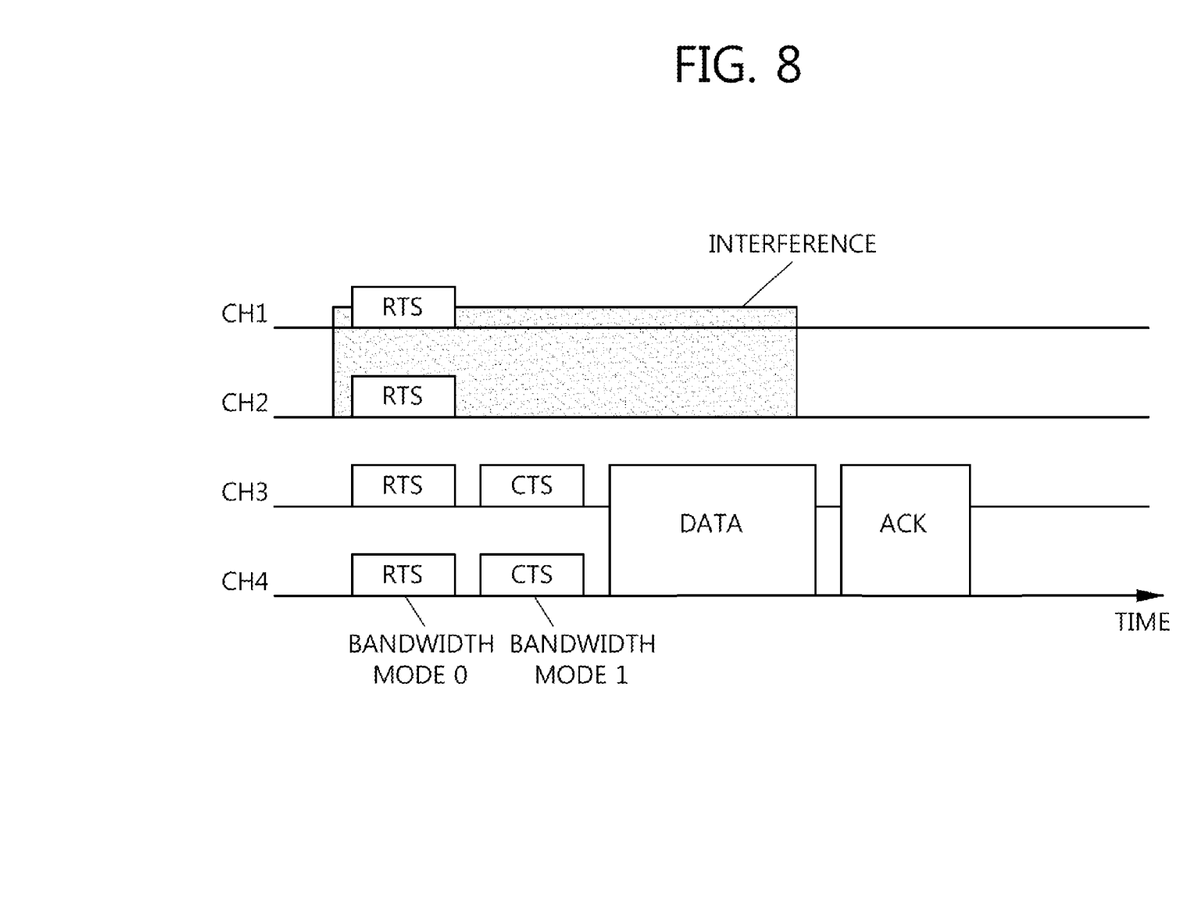
FIG. 8 is an example adopting dynamic bandwidth allocation as an exemplary embodiment of the described symbol repetition transmitting method.

FIG. 8 is an example adopting dynamic bandwidth allocation as an exemplary embodiment of the described symbol repetition transmitting method.

Referring to FIG. 8, it is assumed that when the bandwidth (BW) mode is 0, the bandwidth is 20 MHz, when the bandwidth (BW) mode is 1, the bandwidth is 10 MHz, and the bandwidth (BW) mode is 2, the bandwidth is 5 MHz. In this case, bandwidth information may be designated through the modular 3 result of the frame length information of the present invention during transmitting Request to Send (RTS) and Clear to Send (CTS).

In the case where the terminal the RTS signal is transmitted in the bandwidth mode 0 through channels 1 to 4 before transmitting the data frame, when the RTS receiving terminal senses interferences in channel 1 and channel 2 and is set to be a smaller bandwidth (bandwidth mode 1) to the CTS while transmitting the CTS only channel 3 and channel 4, data may be transmitted according to channel 3 and channel 4. An acknowledgement (ACK) signal may also be transmitted in the same method as the data.

Figure 9:
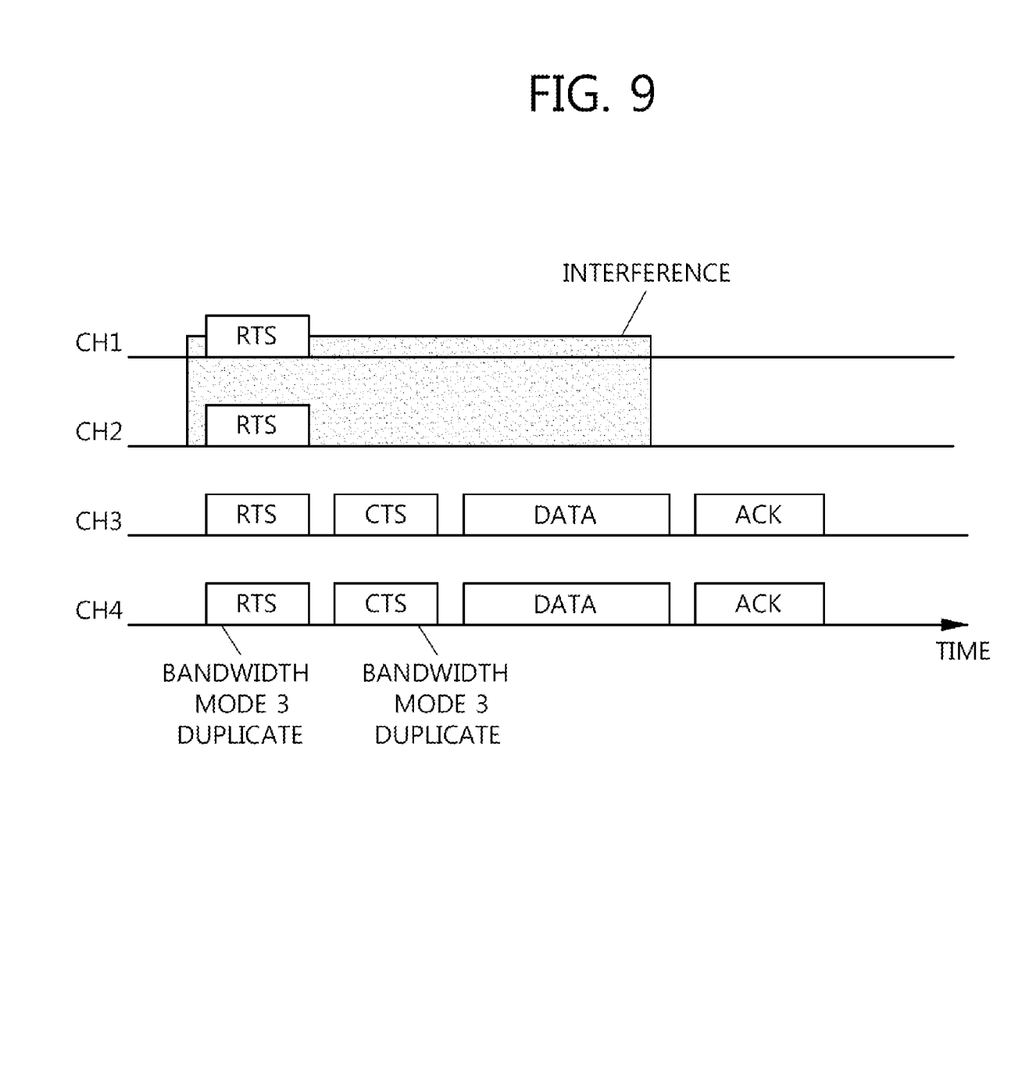
FIG. 9 is an example adopting a duplicate mode as an exemplary embodiment of the described symbol repetition transmitting method.

FIG. 9 is an example adopting a duplicate mode as an exemplary embodiment of the described symbol repetition transmitting method.

Referring to FIG. 9, it is assumed that when the bandwidth (BW) mode is 0, the bandwidth is 20 MHz, when the bandwidth (BW) mode is 1, the bandwidth is 10 MHz, and the bandwidth (BW) mode is 2, the bandwidth is 5 MHz. In this case, during transmitting the RTS and the CTS, as the modular 3 calculation result of the frame length information according to the present invention, duplicate information may be designated.

In the case where the RTS signal is transmitted in the terminal channels 1 to 4 are transmitted before transmitting the data frame, when the RTS receiving terminal senses interferences in channel 1 and channel 2 and is set to be a smaller bandwidth to the CTS while transmitting the CTS only channel 3 and channel 4, the data and the ACK may be transmitted in channel 3 and channel 4.

In this case, since each of the RTS and CTS is set as the bandwidth mode 3 (5 MHz) which the smallest bandwidth, the terminal may repeatedly transmit the same symbol to channels 3 and 4 in a duplicate mode and frequency diversity is acquired to further extend the service field.

The symbol repeated transmission method uses in the present invention includes a time field repeating method and a frequency field repeating method. In the time field repeated transmission method, the same information as the symbol is transmitted after one symbol, but symbols rearranged in a predetermined pattern are repeatedly transmitted to acquire a diversity effect. In the frequency field repeated transmission method, a signal transmitted in one bandwidth is rearranged in a predetermined pattern by using another adjacent band or the same signal is repeatedly transmitted to acquire the diversity effect. The pattern for transmitting the symbol repeatedly may be depending on the implementation.

Figure 10:
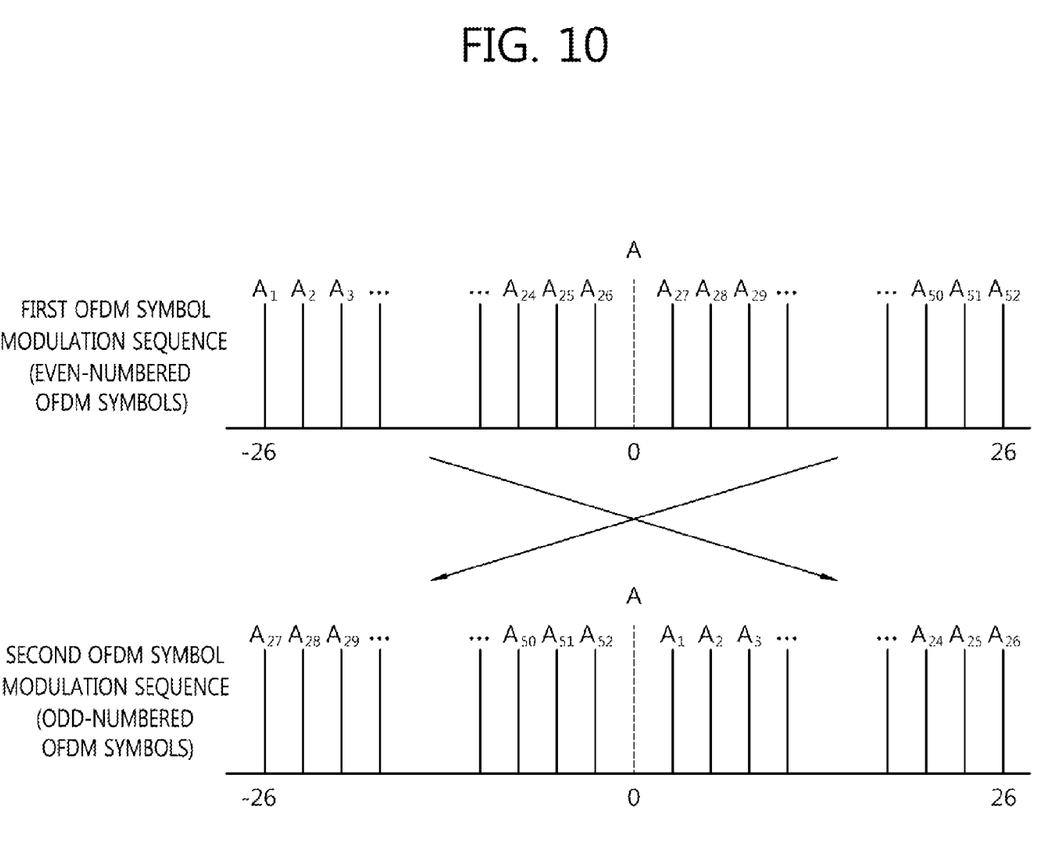
FIG. 10 shows one example of a pattern to repeatedly transmit a symbol according to the present invention.

FIG. 10 shows one example of a pattern to repeatedly transmit a symbol according to the present invention.

Referring to FIG. 10, a carrier having a negative index of a first OFDM symbol modulation sequence may be transmitted as a carrier having a positive index of a second OFDM symbol modulation sequence and a carrier having a positive index of the first OFDM symbol modulation sequence may be transmitted as a carrier having a negative index of the second OFDM symbol modulation sequence. A fast Fourier operation is easy.

Figure 11:
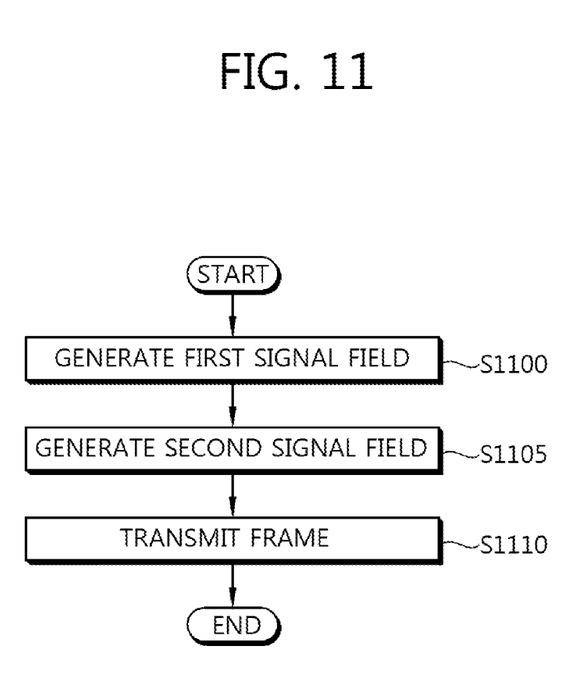
FIG. 11 is one example of a flowchart showing a method for a transmitter to transmit data according to the present invention.

FIG. 11 is one example of a flowchart showing a method for a transmitter to transmit data according to the present invention.

Referring to FIG. 11, a transmitter generates a first signal field (S1100). The first signal field is an L-SIG field.

A second signal field repeatedly configured by a symbol of the first signal field is generated (S1105). The second signal field is an N-SIG field. The second signal field is configured so that the symbol is repeated through the modulation methods of the first to fifth exemplary embodiments.

A frame including the first signal field, the second signal field, and a data field is transmitted (S1110).

Figure 12:
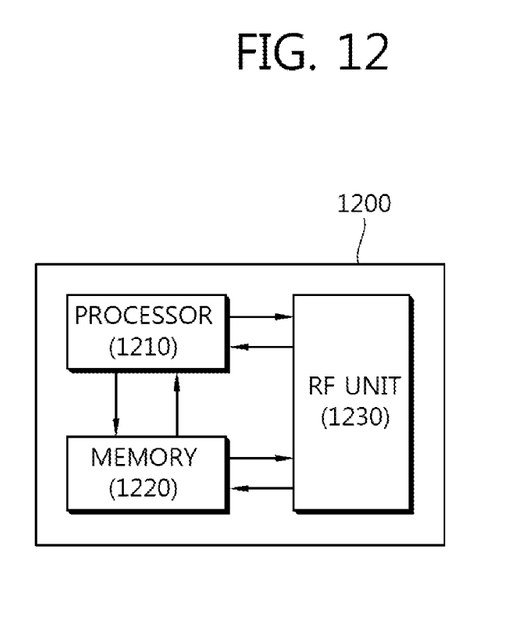
FIG. 12 is a block diagram showing a wireless communication system in which the exemplary embodiment of the present invention is implemented.

FIG. 12 is a block diagram showing a wireless communication system in which the exemplary embodiment of the present invention is implemented.

A transmitter 1200 includes a processor 1210, a memory 1220, and a radio frequency (RF) unit 1230.

The processor 1210 is connected with the memory 1220 and the RF unit 1230 to control the memory 1220 and the RF unit 1230. The processor 1210 generates the second signal field to repeat the symbol of the first signal field and generates the frame including the first signal field and the second signal field according to the present invention.

The memory 1220 is connected with the processor 1210 to store various information for driving the processor 1210.

The RF unit 1230 is connected with the processor 1210 to transmit and/or receive a wireless signal. The frame generated by the processor 1210 is transmitted to a receiver.

The processor may include an application-specific integrated circuit (ASIC), other chipsets, a logic circuit, and/or a data processing device. The memory may include a read-only memory (ROM), a random access memory (RAM), a flash memory, a memory card, a storage medium and/or other storage devices. The RF unit may include a baseband circuit for processing the wireless signal. When the exemplary embodiment is implemented by software, the above-mentioned technique may be implemented by modules (a process and a function) performing the above-mentioned functions. The module is stored in the memory and may be executed by the processor. The memory may be provided in or outside the processor and may be connected with the processor through various well-known members.

According to the configuration of the present invention, a service filed can be extended while maintaining compatibility with a wireless communication system in the related art by transmitting a frame using symbol repetition.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

What is claimed is:

1. A method for a transmitter to transmit data in a wireless communication system, comprising:
  generating a first signal field including a symbol;
  generating a second signal field configured by repeating the symbol of the first signal field, modulating a first repetition of the symbol using a first modulation, and modulating a second repetition of the symbol using a second modulation other than the first modulation; and
  transmitting a frame including the first signal field, the second signal field at a next position after the first signal field, and a data field,
  wherein a number of symbols modulated by the second modulation before a first symbol of the second signal field indicates a number of repetition times of a data symbol.

2. The method of claim 1, wherein the first modulation is binary phase shift keying (BPSK) and the second modulation is Q-binary phase shift keying (Q-BPSK).

3. The method of claim 1, wherein the first modulation is binary phase shift keying (BPSK) and the second modulation is Spread Quadrature Phase Shift Keying (S-QPSK).

4. The method of claim 1, wherein at least an initial three symbols of the second signal field are modulated through binary phase shift keying (BPSK).

5. The method of claim 1, wherein the second signal field includes only one BPSK-modulated symbol.

6. The method of claim 1, wherein the second signal field includes a Spread Quadrature Phase Shift Keying (S-QPSK) modulated symbol.

7. The method of claim 1, further comprising:
  generating a third signal field configured by repeating the symbol of the first signal field,
  wherein the frame further includes the third signal field.

8. The method of claim 1, wherein the frame further includes a preamble, and
  the preamble includes one of a short preamble or a long preamble or both the short preamble and the long preamble.

9. The method of claim 1, wherein the frame is a 802.11a/g standard legacy frame.

10. The method of claim 1, wherein the frame is a 802.11n standard high throughput (HT) frame.

11. The method of claim 1, wherein the frame is a 802.11ac standard very high throughput (VHT) frame.

12. The method of claim 1, wherein rate information of the second signal field includes a transmission rate of the data field.

13. The method of claim 1, wherein a number of symbol repetition times of the second signal field is determined as a modular 3 calculation result of frame length information of the first signal field.

14. The method of claim 13, wherein the number of symbol repetition times is the number of time field repetition times or the number of frequency field repetition times.

15. The method of claim 1, wherein a bandwidth mode of the second signal field is determined as a modular 3 calculation result of the frame length information of the first signal field.

16. The method of claim 1, wherein a modulation method of a symbol of the data field is determined as a modular 3 calculation result of the frame length information of the first signal field.

17. The method of claim 1, wherein a Clear Channel Assessment (CCA) busy time when a receiver of the frame recognizes that a channel is not idle is determined according to length information of the first signal field.

18. The method of claim 1, wherein in repetition of the symbol of the first signal field, a time field repetition method in which the same information is transmitted after one symbol, but a symbol rearranged in a predetermined pattern is repeatedly transmitted is used.

19. The method of claim 1, wherein in the repetition of the symbol of the first signal field, a frequency field repetition method in which a signal transmitted in one bandwidth is rearranged in a predetermined pattern by using the other adjacent bandwidth or same signal is repeatedly transmitted is used.

20. An apparatus for transmitting data in a wireless communication system, comprising:
a processor configured to:
generate a first signal field;
generate a second signal field configured by repeating a symbol of the first signal field, modulating a first repetition of the symbol using a first modulation, and modulating a second repetition of the symbol using a second modulation other than the first modulation; and
transmit a frame including the first signal field, the second signal field at a next position after the first signal field, and a data field,
wherein a number of symbols modulated by the second modulation before a first symbol of the second signal field indicates a number of repetition times of a data symbol.

* * * * *